(12) United States Patent
Slota et al.

(10) Patent No.: US 11,237,990 B2
(45) Date of Patent: *Feb. 1, 2022

(54) FIXED ETHERNET FRAME DESCRIPTOR

(71) Applicant: Intel Corporation, Santa Clara, CA (US)

(72) Inventors: Alexander Slota, Mesa, AZ (US); James Coleman, Mesa, AZ (US); Rajkumar Khandelwal, Chandler, AZ (US); Anil Kumar, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/901,517

(22) Filed: Jun. 15, 2020

(65) Prior Publication Data

US 2021/0064554 A1 Mar. 4, 2021

Related U.S. Application Data

(63) Continuation of application No. 16/236,057, filed on Dec. 28, 2018, now Pat. No. 10,684,963.

(51) Int. Cl.
*G06F 13/28* (2006.01)
*G06F 13/12* (2006.01)
*G06F 12/1081* (2016.01)

(52) U.S. Cl.
CPC ........ *G06F 13/128* (2013.01); *G06F 12/1081* (2013.01); *G06F 13/28* (2013.01); *G06F 2213/2802* (2013.01); *G06F 2213/2806* (2013.01)

(58) Field of Classification Search
CPC .... G06F 13/128; G06F 13/28; G06F 12/1081; G06F 2213/2806; G06F 2213/2802
See application file for complete search history.

(56) References Cited

U.S. PATENT DOCUMENTS

| 5,434,872 | A  | * | 7/1995  | Petersen | G06F 13/128 370/445 |
| 8,081,631 | B1 | * | 12/2011 | Chase    | H04L 12/2852 370/392 |
| 10,684,963 | B2 |   | 6/2020  | Slota et al. | |
| 2005/0210479 | A1 | * | 9/2005 | Andjelic | H04L 49/90 719/321 |
| 2016/0277245 | A1 | * | 9/2016 | Wei      | H04L 12/6418 |
| 2017/0353384 | A1 | * | 12/2017 | Chayat  | H04L 45/566 |

(Continued)

OTHER PUBLICATIONS

"U.S. Appl. No. 16/236,057, Non Final Office Action dated Aug. 8, 2019", 12 pgs.

(Continued)

*Primary Examiner* — Jing-Yih Shyu
(74) *Attorney, Agent, or Firm* — Schwegman Lundberg & Woessner, P.A.

(57) ABSTRACT

System and techniques for enhanced electronic navigation maps for a vehicle are described herein. A descriptor set-up message may be received at a network controller interface (NIC). Here, the descriptor set-up message includes an ethernet frame descriptor. The NIC may then use the ethernet frame descriptor to transmit, across a physical interface of the NIC, multiple ethernet frames, each of which use the same ethernet frame descriptor from the set-up message.

24 Claims, 7 Drawing Sheets

(56) References Cited

U.S. PATENT DOCUMENTS

2018/0081854 A1* 3/2018 Joy .................. G06F 15/17331
2019/0109796 A1* 4/2019 Chehaibar ............. H04L 47/283
2019/0138462 A1  5/2019 Slota et al.

OTHER PUBLICATIONS

"U.S. Appl. No. 16/236,057, Response filed Nov. 8, 2019 to Non-Final Office Action dated Aug. 8, 2019", 11 pgs.
"U.S. Appl. No. 16/236,057, Notice of Allowance dated Feb. 12, 2020", 15 pgs.

* cited by examiner

FIXED ETHERNET FRAME DESCRIPTOR

PRIORITY APPLICATION

This application is a continuation of U.S. application Ser. No. 16/236,057, filed. Dec. 28, 2018 and now issued as U.S. Pat. No. 10,648,963, which is incorporated herein by reference in its entirety.

TECHNICAL FIELD

Embodiments described herein generally relate to computer network interface controls (NICs) and more specifically to a fixed ethernet frame descriptor.

BACKGROUND

Computer networking is an integral part to modern computing systems. Computer networking involves a collection of hardware and software to transfer information from one device to another. Generally, devices include network interface controllers (NICs) to simplify low-level communications across a physical medium, such as radio frequencies (RF), light, fiber optic cables, electrically conductive cables, etc. Ethernet NICs are a popular choice to implement communications between devices.

Traditional ethernet control interfaces include a multi-step process to transmit a packet. Generally, a central processing unit (CPU) or other processing circuitry of a host device begins by constructing a packet descriptor and a payload, storing each in memory. The CPU then initiates the packet transmission via a message to the NIC (e.g., using a mapped-memory input/output (MMIO) write). The NIC then retrieves a packet descriptor from memory. The packet descriptor includes control information for the NIC, such as a source and a destination media access control (MAC) address, an EtherType field giving either the protocol type for the payload protocol or the length of the payload and a location in memory of the payload. The memory location of the payload is used by the MC to then retrieve the payload. The NIC constructs the packet (e.g., including the frame), and transmits the packet.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The traditional ethernet transmission process, with a frame descriptor and payload read for each packet transmission provides a great deal of flexibility for the MC under different scenarios. However, there are times when such flexibility, and the corresponding processing and latency overhead, is problematic. For example, many industrial, automotive, embedded device, and Internet-of-Things (IoT) applications have shrinking compute cycle times and lower tolerances for non-deterministic computations or timing (e.g., jitter) than have been true in the past. Legacy packet transmission flow, with variable packet size and buffer relocation, are not useful for many isochronous or asynchronous workloads due to the regularity—in size, in time, or both—of the transmissions. Thus, the overhead of creating a packet descriptor by the CPU, writing the descriptor to memory, and reading that descriptor by the NIC before beginning to construct the packet by the NIC wastes CPU cycles, bus capacity, memory storage space, energy, and time.

Although attempts to address jitter problems in current transmissions exist, they maintain many of the issues noted above. For example, to reduce jitter (e.g., increase predictability of deterministic compute), packets may be scheduled for transmission at a certain time in the future. Here, the NIC waits until the preprogrammed pre-fetch time expires to read the data and then transmit the packet. This technique may mask the packet transmission overhead incurred by the CPU to the network if the transmission intervals are longer than the longest transmission overhead incurred by the CPU. However, this technique still requires the full legacy packet transmission flow. Specifically, the CPU must always write new descriptors and the Ethernet IP must read these new descriptors. Also, the masking of packet transmission overhead through this technique is possible only if both the packet and descriptor are available ahead of time. However, this violates the efficiency ideal of just-in-time production of the packet by the CPU, As a result, preparing the packet ahead of time and scheduling its launch achieves determinism but at the high cost of reduced CPU time available for packet creation. Accordingly, the problems of wasted CPU cycles, bus capacity, memory storage space, energy, and time still exist.

Many of the industrial, automotive, or embedded application's asynchronous and isochronous real-time workloads do not require the flexibility provided by the traditional ethernet one-packet-descriptor per packet arrangement. What is needed is a more efficient technique for conveying the packet descriptor information to a NIC for these workloads. A fixed ethernet frame descriptor, as described herein, provides such a solution. The fixed ethernet frame descriptor is a descriptor that the NIC uses for multiple frame transmissions. The frame header information, such as the source and destination MAC addresses, is reused on the several packets, as is the payload location (e.g., the memory address in which the payload is stored). The CPU, or other entity, provides the descriptor, and then updates the data in the storage location defined by the descriptor. The transmission may be asynchronous initiated whenever by the CPU via a start packet transmission message, or the transmission may be isochronous in which time determines when a transmission will occur.

Fixed ethernet frame descriptors reduce packet transmission latency, jitter, as well as overall device bus traffic by eliminating the constant transmission of the descriptor in traditional ethernet processes. This improves ethernet performance in a variety of use-cases, such as industrial, automotive, or high band-width applications e.g., those found in communications infrastructures such as cloud radio access networks (CRAN). Additional details and examples are provided below.

Figure 1:
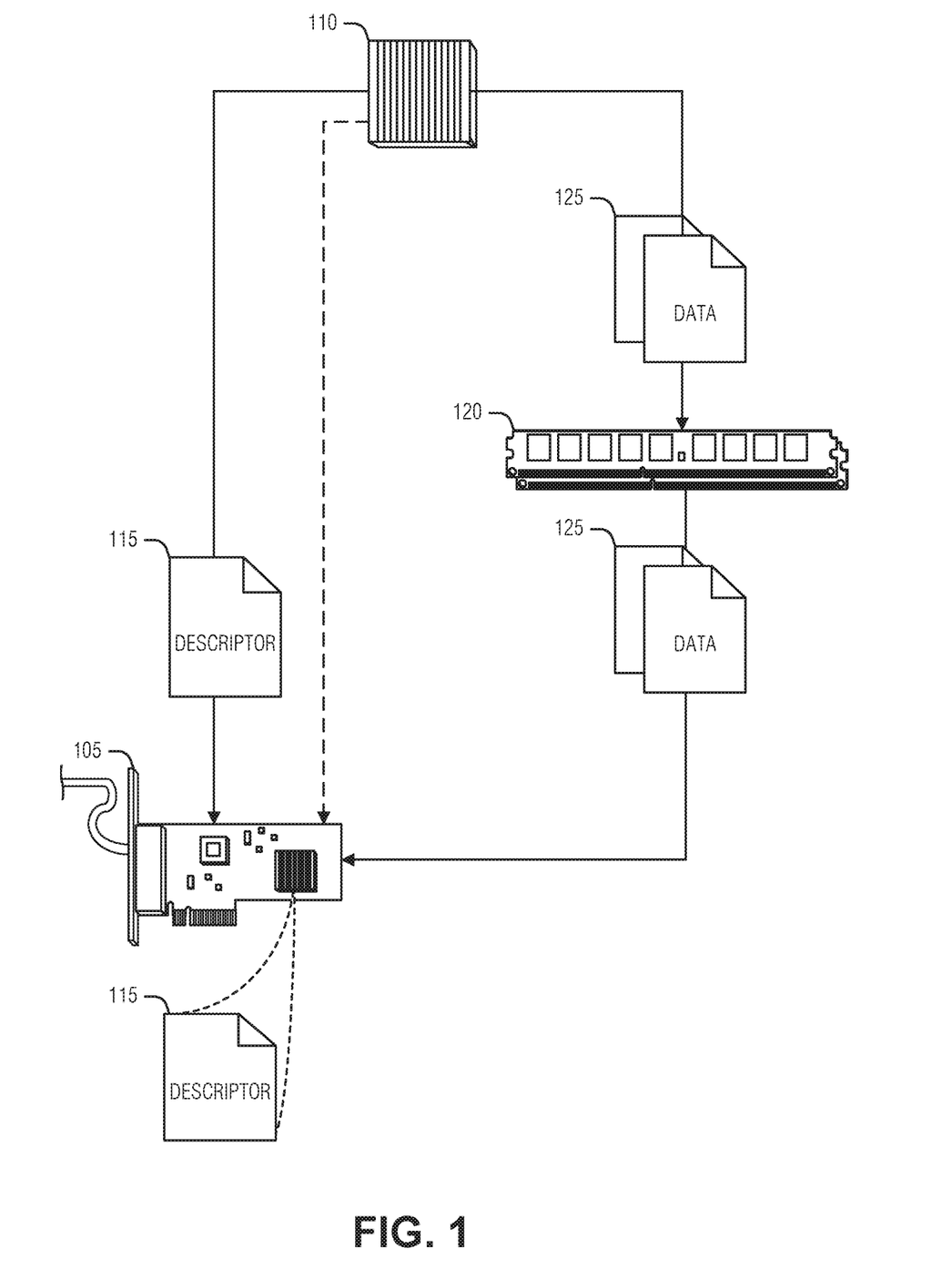
FIG. 1 is a block diagram of an example of a system implementing a fixed ethernet frame descriptor, according to an embodiment.

FIG. 1 is a block diagram of an example of a system implementing a fixed ethernet frame descriptor, according to an embodiment. The system includes a NIC 105, a CPU 110, and memory 120. In an example, these components are co-located on a system-on-a-chip (SOC). The CPU 110 may be replaced by other processing circuitry that may interact with the NIC 105, such as a field-programmable gate array (FPGA), digital signal processor (DSP), graphics processing unit (GPU), or the like. The memory 120 may be any storage directly addressable by the NIC 105 when in operation, such as random access memory (RAM).

To use a fixed ethernet frame descriptor, the NIC 105 is configured to receive a descriptor set-up message from the CPU 110. Here, the descriptor set-up message includes an ethernet frame descriptor 115. The descriptor 115 is stored in the NIC 105. In an example, the descriptor set-up message puts the NIC 105 into a fixed descriptor mode.

The NIC 105 is configured to transmit multiple ethernet frames across a physical interface. Each of these ethernet frames uses the same ethernet frame descriptor 115. In an example, the NIC 105 does not perform an ethernet frame descriptor read between receiving the descriptor set-up message and transmission of a final ethernet frame corresponding to the multiple transmission messages. This last example avoids all of the overhead associated with traditional ethernet communications. However, in an example, the NIC 105 is configured to periodically read a portion of the memory 120 to retrieve a fixed ethernet frame descriptor update. This example provides some ability for the CPU 110 to update the frame descriptor without incurring the per-frame overhead of the traditional ethernet technique.

In an example, the NIC 105 is configured to use the frame descriptor 115 until it receives a new frame descriptor from the CPU 110. In an example, the MC 105 is configured to use the frame descriptor 115 until it receives a stop fixed descriptor message from the CPU 110, perhaps taking the NIC 105 out of a fixed descriptor mode. In an example, upon receipt of the stop fixed descriptor message, the MC 105 clears the fixed descriptor 115 from its internal storage.

In an example, for each transmitted frame, the NIC 105 is configured to read data 125 at a memory address in the memory 120 that is specified in the ethernet frame descriptor 115. In an example, the read is initiated in response to receipt of a transmission message. The transmission message is illustrated as a dashed line from the CPU 110 to the MC 105. This is a form of asynchronous transmission whereby the CPU 110 controls when packets are transmitted on a per-packet basis via the start transmission message. The NIC 105 then reads the data 125, which the CPU 110 is responsible for updating in the memory location of the fixed descriptor 115, and proceeds with the transmission process. In an example, several packet transmission messages are contiguous. Thus, in this example, once the fixed descriptor 115 is stored in the NIC 105, every packet uses that same fixed descriptor 115 until it is cleared or replaced by another, or taken out of the fixed descriptor mode.

After the data 125 is read from the memory 120, the NIC 105 is configured to construct the ethernet frame. This includes using the ethernet frame descriptor 115 to populate a header of the frame and using the data 125 as a payload of the frame. The header information includes fixed values from the fixed descriptor 115, such as the source address, the destination address, the payload size, and the payload type.

In an example, the descriptor set-up message includes multiple ethernet frame descriptors. Here, the multiple ethernet frame descriptors are stored in the NIC 105 and applied by the NIC 105 under different conditions. For example, the NIC 105 may sequentially apply the ethernet frame descriptors upon receipt of a start transmission message from the CPU 110. Thus, the CPU 110 creates a sequence whereby a first packet is sent using a first descriptor, and then the next packet uses a next descriptor, and so on until the descriptors start over. This is another form of asynchronous transmission.

Another form of transmission is isochronous transmission. Here, timing is used to initiate packet transmissions rather than a message from the CPU 110. Thus, in an example, one of the multiple ethernet frame descriptors is applied to a given ethernet frame according to a schedule provided in the descriptor set-up message. In an example, the schedule defines a sequential application of the one of the multiple ethernet frame descriptors. This example may include such things as, every ten milliseconds, use descriptor A, and every 7 milliseconds use descriptor B, etc. In an example, the schedule defines fixed times to apply the one of the multiple ethernet frame descriptors. In this example, the NIC 105 uses a clock to schedule a transmission at 16:00 every Wednesday, for example.

This system, and the fixed ethernet frame descriptor techniques described herein, removes the time it takes for the NIC 105 to respond to a transmit request. It also removes bus (e.g., PCIe) read latency overhead with respect to the fixed descriptor 115. Because of the reduced number of round trips between the NIC 105 and the memory 120, the jitter is also effectively reduced. Removing these hardware latencies enables low latency and low jitter transmissions while also reducing bus traffic in the system, CPU 110 processing overhead, and energy use.

Figure 2:
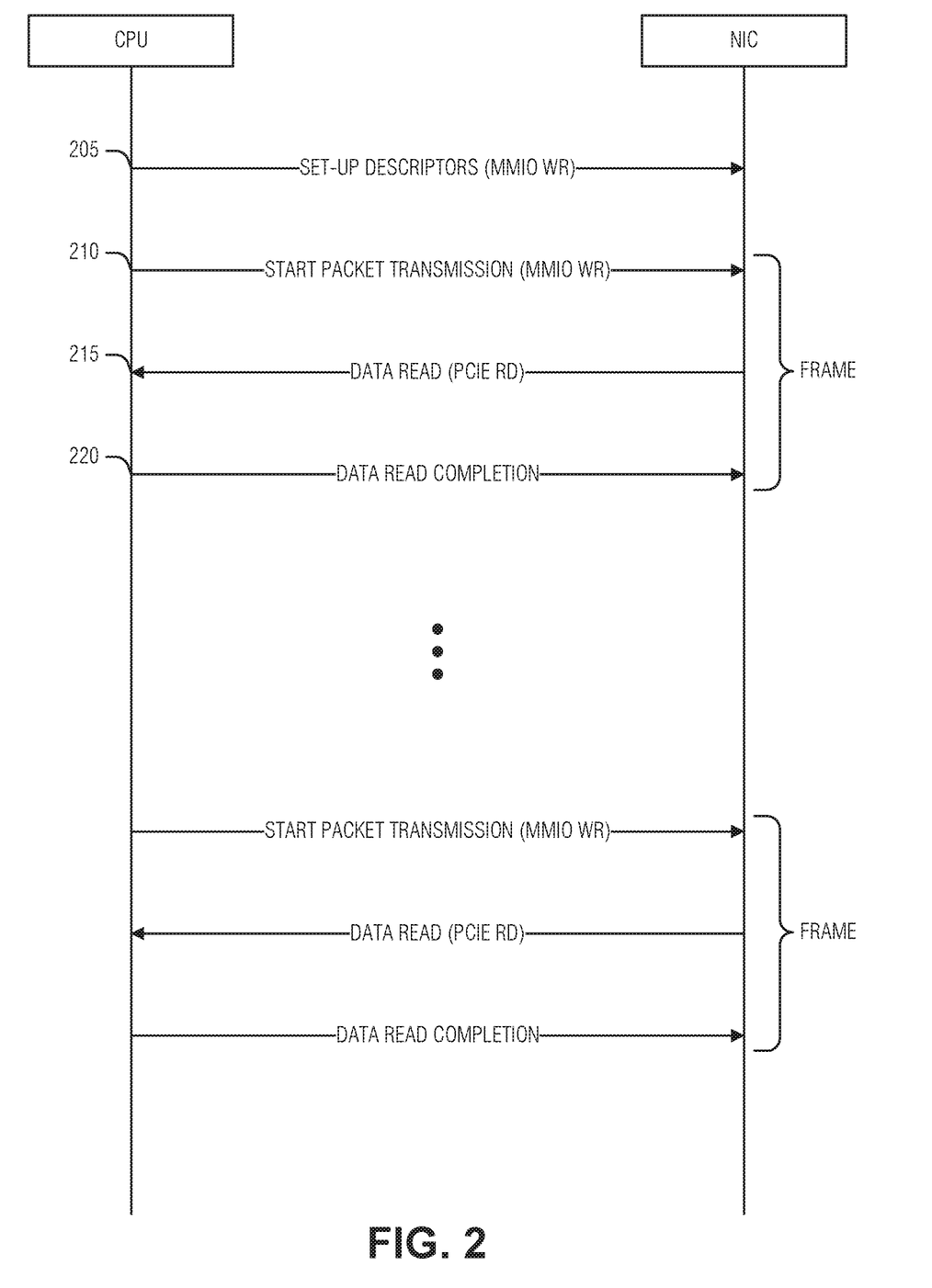
FIG. 2 illustrates a message flow of an asynchronous transmission flow using a fixed ethernet frame descriptor, according to an embodiment.

FIG. 2 illustrates a message flow of an asynchronous transmission flow using a fixed ethernet frame descriptor, according to an embodiment. In this model of communication, the CPU sets up the descriptor (e.g., transfers the descriptor) to the MC via message 205 (e.g., via a MMIO write). Once complete, the CPU initiates a transmission via a start transmission message 210 to the NIC. The NIC then initiates a read for the data (e.g., a peripheral component interface (PCI) express (PCIe) read) with message 215. Once the data is returned via message 220, the NIC constructs and transmits the frame. The sequence of messages 210, 215, and 220 is repeated for each new frame using the same descriptor.

Figure 3:
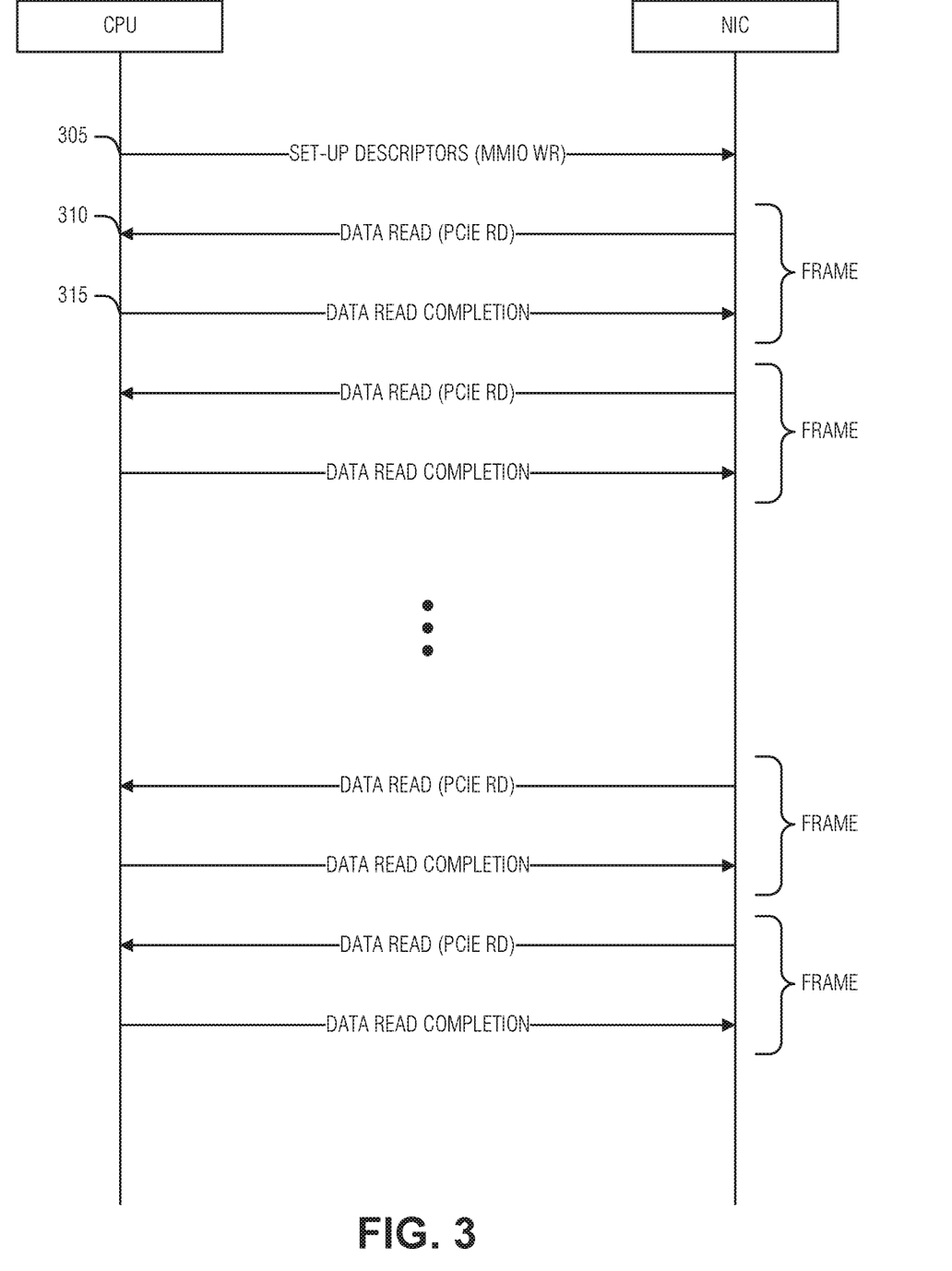
FIG. 3 illustrates a message flow of an isochronous transmission flow using a fixed ethernet frame descriptor, according to an embodiment.

FIG. 3 illustrates a message flow of an isochronous transmission flow using a fixed ethernet frame descriptor, according to an embodiment. In the isochronous model, fixed descriptor rings are stored on the NIC. Based on the isochronous schedule which maps the fixed descriptors to a point in time reads are issued to the appropriate location in memory using the appropriate fixed descriptor. For example, if there are three fixed descriptor rings stored in the NIC that may be recycled, multiple frames may be read in succession without needing the CPU to write new descriptors.

Thus, the sequence as illustrated, may include a set-up descriptors message 305 in which the multiple descriptors are communicated to the NIC. Here, also, the schedule for each of the descriptors is delivered. Based on the schedule, the NIC operates to request data via message 310, and use the data returned via message 315 to construct and transmit the frame. This sequence repeats, using the timing and descriptor as dictated by the schedule from the set-up descriptors message 305.

Figure 4:
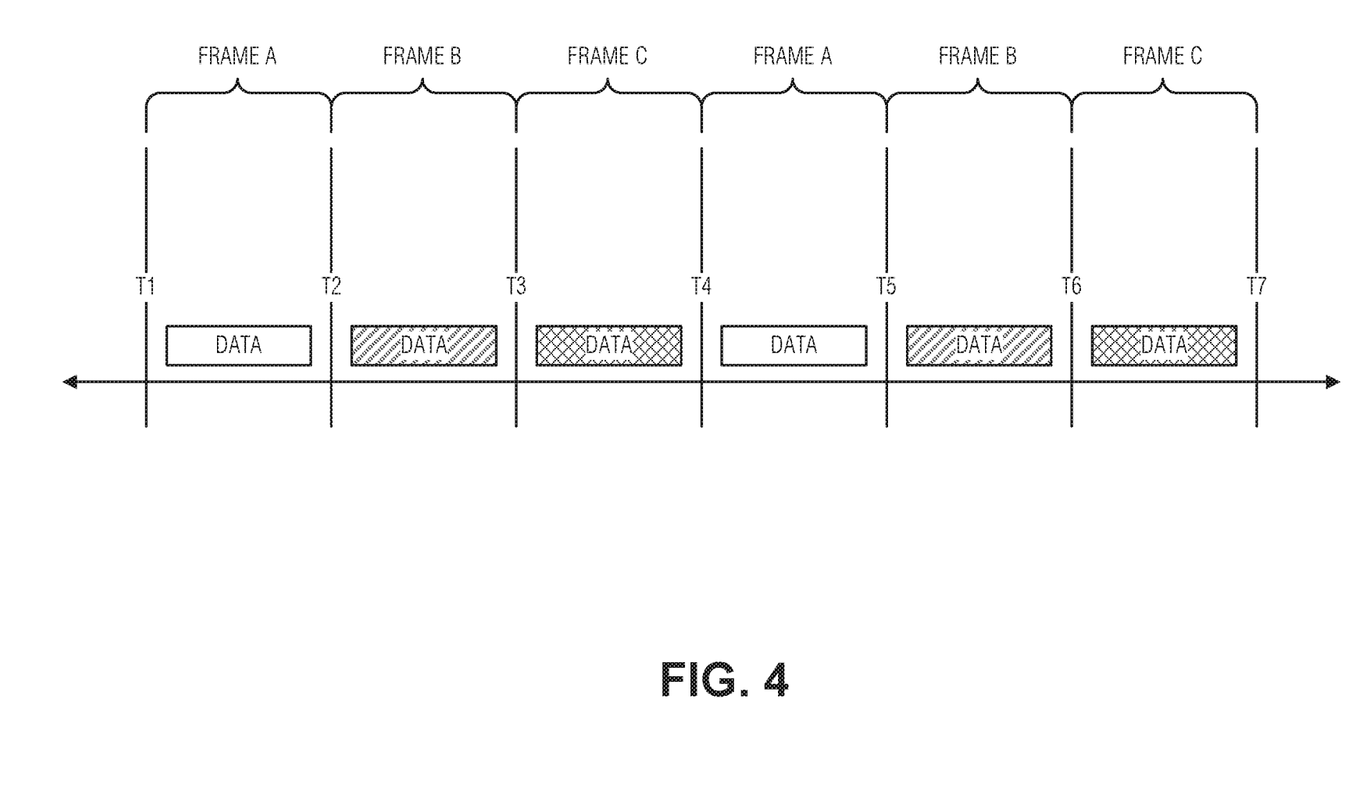
FIG. 4 illustrates an example of a relationship between transmission frames and time with multiple fixed ethernet frame descriptors, according to an embodiment.

FIG. 4 illustrates an example of a relationship between transmission frames and time with multiple fixed ethernet frame descriptors, according to an embodiment. Here, the repeating control loop in an isochronous model cycles through frames A-C based on the time (illustrated as T1-T7). This result may occur from a schedule that specifies a transmission every time interval T while sequentially cycling through the fixed ethernet frame descriptors.

Figure 5:
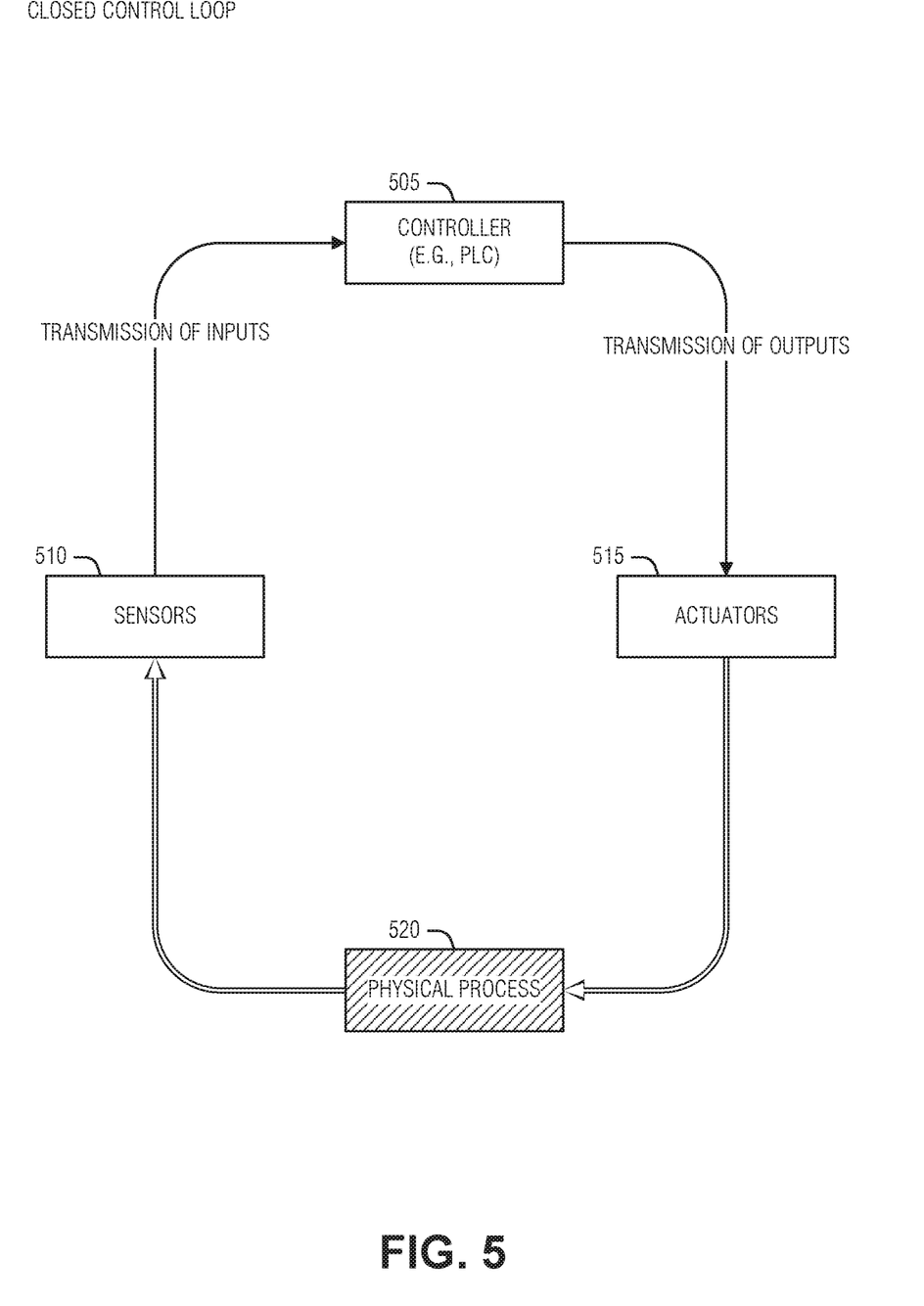
FIG. 5 illustrates an example of an environment that benefits from a fixed ethernet frame descriptor, according to an embodiment.

FIG. 5 illustrates an example of an environment that benefits from a fixed ethernet frame descriptor, according to an embodiment. As noted above, the flexibility of traditional ethernet is powerful, but often unnecessary in some scenarios. One such scenario is the closed control loop here illustrated. Sensors 510 often operate on a duty cycle, producing output every time period (e.g., once a second, twice a week, every millisecond, etc.). The sensors 510 output to only one entity—or to an unchanging set of entities; here it is the controller 505. The controller 505 processes the sensor data and determines a series of actions to effect the physical process 520 based on the sensor readings. The controller 505 effectuates these actions by a communication to one or more actuators 515, which physically operate on the physical process 520. Again, the output from the controller 505 is often on a fixed schedule—e.g., driven by the sensor 510 output, and to a fixed set of recipients (e.g., actuators 515). Moreover, both the sensor data and the controller outputs are generally of fixed sizes.

Examples of close control loop industrial systems include robotic arm movements in factory, lidar base control on autonomous vehicles, or sensors for flight control systems. Each of these, and more, benefit from fixed ethernet descriptor systems and techniques described herein.

Figure 6:
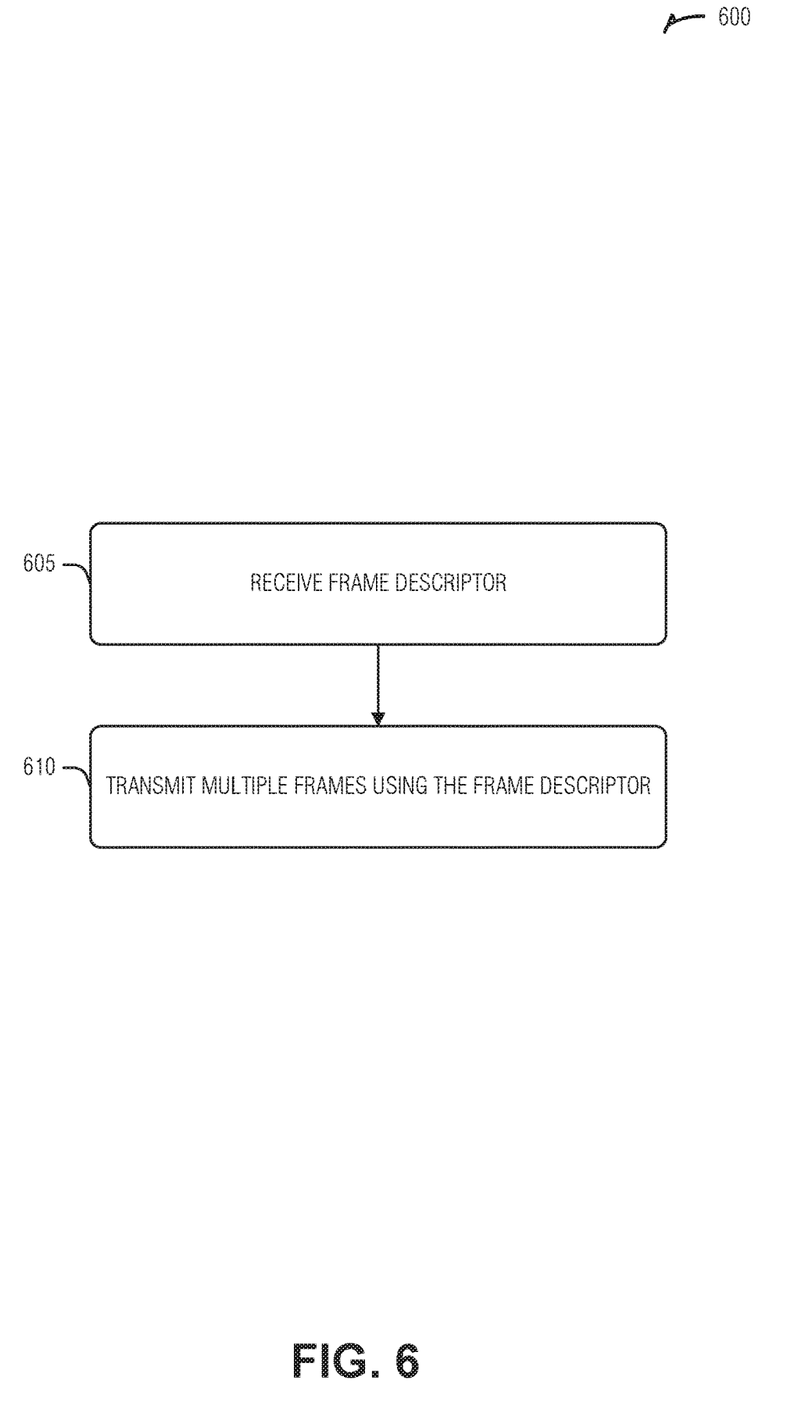
FIG. 6 illustrates a flow diagram of an example of a method for a fixed ethernet frame descriptor, according to an embodiment.

FIG. 6 illustrates a flow diagram of an example of a method 600 for a fixed ethernet frame descriptor, according to an embodiment. The operations of the method 600 are implemented in computer hardware (e.g., a controller of a NIC), such as that described above or below (e.g., processing circuitry).

At operation 605, a descriptor set-up message is received at the NIC. Here, the descriptor set-up message includes an ethernet frame descriptor.

At operation 610, multiple ethernet frames are transmitted across a physical interface of the NIC. Each of these ethernet frames uses the same ethernet frame descriptor. In an example, the NIC does not perform an ethernet frame descriptor read between receiving the descriptor set-up message and transmission of a final ethernet frame corresponding to the multiple transmission messages.

In an example, for each transmitted frame, the NIC reads data at a memory address specified in the ethernet frame descriptor. In an example, the read is initiated in response to receipt of a transmission message. In an example, several packet transmission messages are contiguous.

After the data is read, the NIC constructs the ethernet frame. The ethernet frame construction includes using the ethernet frame descriptor to populate a header of the frame and using the data as a payload of the frame.

In an example, the descriptor set-up message includes multiple ethernet frame descriptors. Here, the multiple ethernet frames are one set of several sets of ethernet frames, each member of the several sets corresponding to one of the multiple ethernet frame descriptors. In an example, one of the multiple ethernet frame descriptors is applied to a given ethernet frame according to a schedule provided in the descriptor set-up message. In an example, the schedule defines a sequential application of the one of the multiple ethernet frame descriptors. In an example, the schedule defines fixed times to apply the one of the multiple ethernet frame descriptors.

Figure 7:
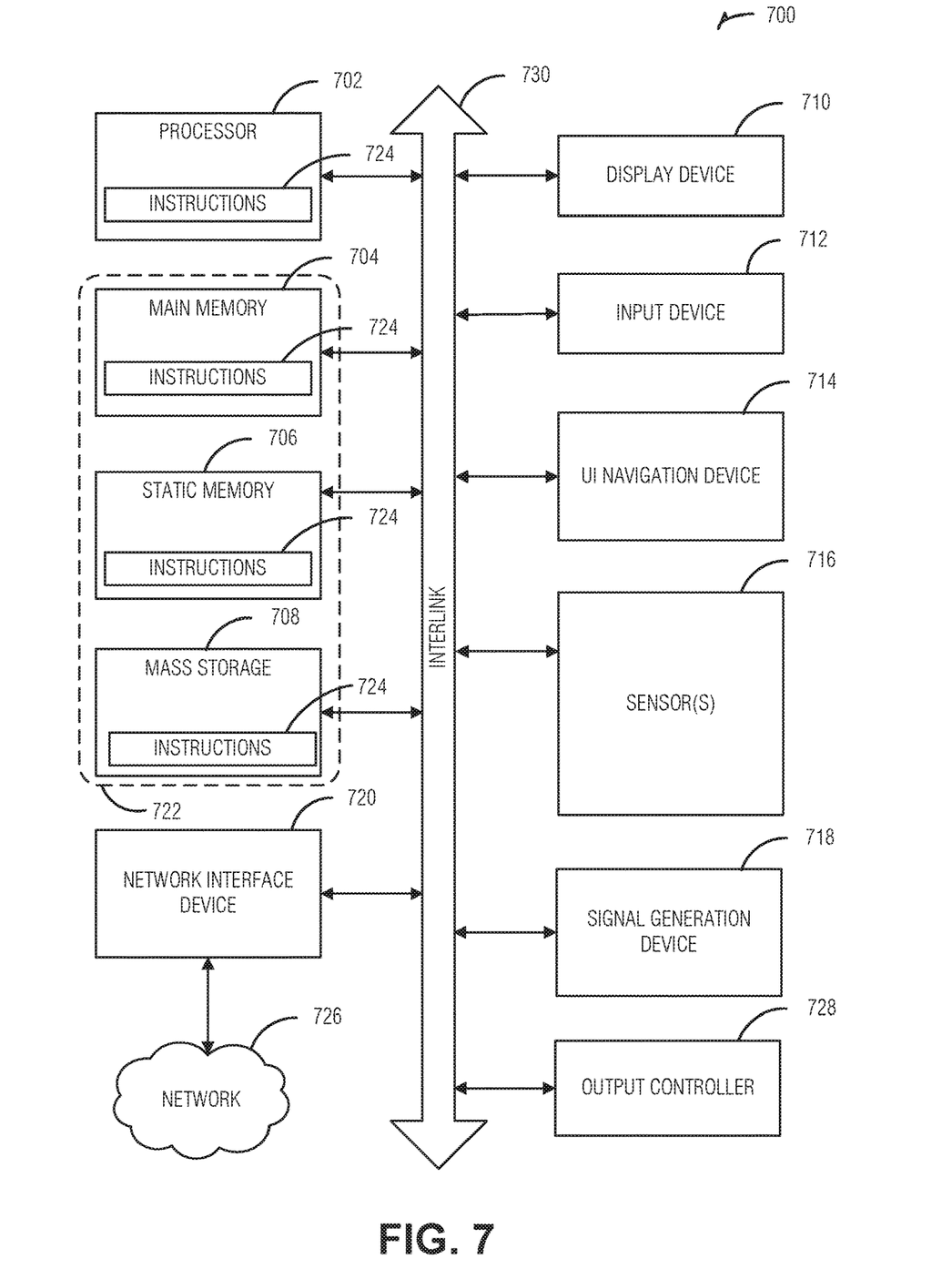
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. Examples, as described herein, may include, or may operate by, logic or a number of components, or mechanisms in the machine 700. Circuitry (e.g., processing circuitry) is a collection of circuits implemented in tangible entities of the machine 700 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 700 follow.

In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 700 may include a hardware processor 702 (e.g., a central processing unit (CPU), a graphics processing unit (GPU), a hardware processor core, or any combination thereof), a main memory 704, a static memory (e.g., memory or storage for firmware, microcode, a basic-input-output (BIOS), unified extensible firmware interface (UEFI), etc.) 706, and mass storage 708 (e.g., hard drive, tape drive, flash storage, or other block devices) some or all of which may communicate with each other via an interlink (e.g., bus) 730. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e g., drive unit) 708, a signal generation device 718 (e.g., a speaker), a network interface device 720, and one or more sensors 716, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 702, the main memory 704, the static memory 706, or the mass storage 708 may be, or include, a machine readable medium 722 on which is stored one or more sets of data structures or instructions 724 (e.g., software) embodying or utilized by any one or more of the techniques or functions described herein. The instructions 724 may also reside, completely or at least partially, within any of registers of the processor 702, the main memory 704, the static memory 706, or the mass storage 708 during execution thereof by the machine 700. In an example, one or any combination of the hardware processor 702, the main memory 704, the static memory 706, or the mass storage 708 may constitute the machine readable media 722. While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 722 may be representative of the instructions 724, such as instructions 724 themselves or a format from which the instructions 724 may be derived. This format from which the instructions 724 may be derived may include source code, encoded instructions (e.g., in compressed or encrypted form), packaged instructions (e.g., split into multiple packages), or the like. The information representative of the instructions 724 in the machine readable medium 722 may be processed by processing circuitry into the instructions to implement any of the operations discussed herein. For example, deriving the instructions 724 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 724.

In an example, the derivation of the instructions 724 may include assembly, compilation, or interpretation of the information (e.g., by the processing circuitry) to create the instructions 724 from some intermediate or preprocessed format provided by the machine readable medium 722. The information, when provided in multiple parts, may be combined, unpacked, and modified to create the instructions 724. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable at a local machine, and executed by the local machine.

The instructions 724 may be further transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software. A transmission medium is a machine readable medium.

ADDITIONAL NOTES & EXAMPLES

Example 1 is a device for a fixed ethernet frame descriptor, the device comprising: a memory including instructions; and processing circuitry that, when in operation, is configured by the instructions to: receive, at a network controller interface (NIC), a descriptor set-up message, the descriptor set-up message including an ethernet frame descriptor; and transmit, across a physical interface of the NIC, multiple ethernet frames, each of the multiple ethernet frames using the ethernet frame descriptor.

In Example 2, the subject matter of Example 1, wherein, to transmit the multiple ethernet frames, the processing circuitry is configured by the instructions to, for each frame: read data at a memory address specified in the ethernet frame descriptor; and construct the ethernet frame, wherein the ethernet frame descriptor is used to populate a header of the frame, and wherein the data is used as a payload of the frame.

In Example 3, the subject matter of Example 2, wherein, to transmit the multiple ethernet frames, the processing circuitry is configured by the instructions to receive a packet transmission messages to initiate read the data at the memory address.

In Example 4, the subject matter of Example 3, wherein the packet transmission messages are contiguous.

In Example 5, the subject matter of any of Examples 1-4, wherein the descriptor set-up message includes multiple ethernet frame descriptors, and wherein the multiple ethernet frames are one set of several sets of ethernet frames, each member of the several sets corresponding to one of the multiple ethernet frame descriptors.

In Example 6, the subject matter of Example 5, wherein one of the multiple ethernet frame descriptors is applied to a given ethernet frame according to a schedule provided in the descriptor set-up message.

In Example 7, the subject matter of Example 6, wherein the schedule defines a sequential application of the one of the multiple ethernet frame descriptors.

In Example 8, the subject matter of any of Examples 6-7, wherein the schedule defines fixed times to apply the one of the multiple ethernet frame descriptors.

Example 9 is a method for a fixed ethernet frame descriptor, the method comprising: receiving, at a network controller interface (NIC), a descriptor set-up message, the descriptor set-up message including an ethernet frame descriptor; and transmitting, across a physical interface of the NIC, multiple ethernet frames, each of the multiple ethernet frames using the ethernet frame descriptor.

In Example 10, the subject matter of Example 9, wherein transmitting the multiple ethernet frames includes, for each frame: reading data at a memory address specified in the ethernet frame descriptor; and constructing the ethernet frame, including: using the ethernet frame descriptor to populate a header of the frame; and using the data as a payload of the frame.

In Example 11, the subject matter of Example 10, wherein transmitting the multiple ethernet frames includes receiving a packet transmission messages to initiate read the data at the memory address.

In Example 12, the subject matter of Example 11, wherein the packet transmission messages are contiguous.

In Example 13, the subject matter of any of Examples 9-12, wherein the descriptor set-up message includes multiple ethernet frame descriptors, and wherein the multiple ethernet frames are one set of several sets of ethernet frames, each member of the several sets corresponding to one of the multiple ethernet frame descriptors.

In Example 14, the subject matter of Example 13, wherein one of the multiple ethernet frame descriptors is applied to a given ethernet frame according to a schedule provided in the descriptor set-up message.

In Example 15, the subject matter of Example 14, wherein the schedule defines a sequential application of the one of the multiple ethernet frame descriptors.

In Example 16, the subject matter of any of Examples 14-15, wherein the schedule defines fixed times to apply the one of the multiple ethernet frame descriptors.

Example 17 is at least one machine readable medium including information corresponding to instructions for a fixed ethernet frame descriptor, the instructions, when executed by processing circuitry, cause the processing circuitry to perform operations comprising: receiving, at a network controller interface (NIC), a descriptor set-up message, the descriptor set-up message including an ethernet frame descriptor; and transmitting, across a physical interface of the NIC, multiple ethernet frames, each of the multiple ethernet frames using the ethernet frame descriptor.

In Example 18, the subject matter of Example 17, wherein transmitting the multiple ethernet frames includes, for each frame: reading data at a memory address specified in the ethernet frame descriptor; and constructing the ethernet frame, including: using the ethernet frame descriptor to populate a header of the frame; and using the data as a payload of the frame.

In Example 19, the subject matter of Example 18, wherein transmitting the multiple ethernet frames includes receiving a packet transmission messages to initiate read the data at the memory address.

In Example 20, the subject matter of Example 19, wherein the packet transmission messages are contiguous.

In Example 21, the subject matter of any of Examples 17-20, wherein the descriptor set-up message includes multiple ethernet frame descriptors, and wherein the multiple ethernet frames are one set of several sets of ethernet frames, each member of the several sets corresponding to one of the multiple ethernet frame descriptors.

In Example 22, the subject matter of Example 21, wherein one of the multiple ethernet frame descriptors is applied to a given ethernet frame according to a schedule provided in the descriptor set-up message.

In Example 23, the subject matter of Example 22, wherein the schedule defines a sequential application of the one of the multiple ethernet frame descriptors.

In Example 24, the subject matter of any of Examples 22-23, wherein the schedule defines fixed times to apply the one of the multiple ethernet frame descriptors.

Example 25 is at least one machine-readable medium including instructions that, when executed by processing circuitry, cause the processing circuitry to perform operations to implement of any of Examples 1-24.

Example 26 is an apparatus comprising means to implement of any of Examples 1-24.

Example 27 is a system to implement of any of Examples 1-24.

Example 28 is a method to implement of any of Examples 1-24.

Example 29 is at least one machine-readable storage medium comprising information representative of instructions that, when executed by processing circuitry, cause the processing circuitry to perform the operations of any of Examples 1-24.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above, Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A device for a fixed ethernet frame descriptor, the device comprising:
   a memory including instructions; and
   processing circuitry that, when in operation, is configured by the instructions to:
   receive a descriptor set-up message, the descriptor set-up message including an ethernet frame descriptor;
   store the ethernet frame descriptor in the device and placing the device into a fixed descriptor mode in response to receiving the descriptor set-up message;
   receive a set of transmission messages; and
   for each transmission message in the set of transmission messages:
   constructing an ethernet frame using the ethernet frame descriptor stored in the device; and
   transmitting, across a physical interface of the device, the ethernet frame.

2. The device of claim 1, wherein the ethernet frame descriptor includes one or more of the following fields:
   source media access control (MAC) address;
   destination MAC address;
   payload protocol type;
   payload length; or
   memory address for payload the memory address being an address in host memory external to the device.

3. The device of claim 2, wherein, to construct the ethernet frame, the processing circuitry is configured by the instructions to:
   read data at the memory address for the payload specified in the ethernet frame descriptor stored in the device, the memory address unchanging between ethernet frames constructed for different transmission messages in the set of transmission messages; and
   using the data as the payload in the ethernet frame.

4. The device of claim 1, wherein the processing circuitry is configured by the instructions to:
   read, periodically, a host memory address to retrieve an update to the ethernet frame descriptor; and
   apply the update to the ethernet frame descriptor stored in the device.

5. The device of claim 2, wherein the processing circuitry is configured by the instructions to:
   receive a new fixed descriptor set-up message with a new ethernet frame descriptor; and
   replace the ethernet frame descriptor stored in the device with the new ethernet frame descriptor.

6. The device of claim 1, wherein the processing circuitry is configured by the instructions to:
   receive a stop fixed descriptor message;
   take the device out of fixed descriptor mode in response to receiving the stop fixed descriptor message; and
   clear the ethernet frame descriptor from the device.

7. The device of claim 1, wherein the descriptor set-up message includes several ethernet frame descriptors including the ethernet frame descriptor; wherein a specific one of the several ethernet frame descriptors is selected by the device to create ethernet frames in response to transmission messages based on a set of conditions.

8. The device of claim 1, wherein the host device is part of a control loop with other devices.

9. The device of claim 8, wherein the host device is one of a sensor, monitor, controller, or actuator.

10. The device of claim 8, wherein the control loop facilitates operation of a machine.

11. The device of claim 10, wherein the machine is at least one of a robot or a vehicle.

12. The device of claim 11, wherein the vehicle flies or moves along ground.

13. At least one non-transitory machine-readable medium including instructions to implement a fixed ethernet frame descriptor, the instructions, when executed by processing circuitry, cause the processing circuitry to perform operations comprising:
- receiving, at a network controller interface (MC) of a host device, a descriptor set-up message, the descriptor set-up message including an ethernet frame descriptor;
- storing the ethernet frame descriptor in the NIC and placing the MC into a fixed descriptor mode in response to receiving the descriptor set-up message;
- receiving, by the NIC, a set of transmission messages; and
- for each transmission message in the set of transmission messages:
  - constructing an ethernet frame using the ethernet frame descriptor stored in the NIC; and
  - transmitting, across a physical interface of the NIC, the ethernet frame.

14. The at least one non-transitory machine-readable medium of claim 13, wherein the ethernet frame descriptor includes one or more of the following fields:
- source media access control (MAC) address;
- destination MAC address;
- payload protocol type;
- payload length; or
- memory address for payload, the memory address being an address in host memory external to the NIC.

15. The at least one non-transitory machine-readable medium of claim 14, wherein constructing the ethernet frame includes:
- reading data at the memory address for the payload specified in the ethernet frame descriptor stored in the NIC, the memory address unchanging between ethernet frames constructed for different transmission messages in the set of transmission messages; and
- using the data as the payload in the ethernet frame.

16. The at least one non-transitory machine-readable medium of claim 13, wherein the operations comprise:
- reading, periodically by the NIC, a host memory address to retrieve an update to the ethernet frame descriptor; and
- applying, by the NIC, the update to the ethernet frame descriptor stored in the NIC.

17. The at least one non-transitory machine-readable medium of claim 16, wherein the operations comprise:
- receiving, by the NIC, a new fixed descriptor set-up message with a new ethernet frame descriptor; and
- replacing, by the NIC, the ethernet frame descriptor stored in the NIC with the new ethernet frame descriptor.

18. The at least one non-transitory machine-readable medium of claim 13, wherein the operations comprise:
- receiving, by the NIC, a stop fixed descriptor message;
- taking the NIC out of fixed descriptor mode in response to receiving the stop fixeE descriptor message; and
- clearing the ethernet frame descriptor from the NIC.

19. The at least one non-transitory machine-readable medium of claim 13, wherein the descriptor set-up message includes several ethernet frame descriptors including the ethernet frame descriptor; wherein a specific one of the several ethernet frame descriptors is selected by the NW to create ethernet frames in response to transmission messages based on a set of conditions.

20. The at least one non-transitory machine-readable medium of claim 13, wherein the host device is part of a control loop with other devices.

21. The at least one non-transitory machine-readable medium of claim 20, wherein the host device is one of a sensor, monitor, controller, or actuator.

22. The at least one non-transitory machine-readable medium of claim 20, wherein the control loop facilitates operation of a machine.

23. The at least one non-transitory machine-readable medium of claim 22, wherein the machine is at least one of a robot or a vehicle.

24. The at least one non-transitory machine-readable medium of claim 23, wherein the vehicle flies or moves along ground.

* * * * *

UNITED STATES PATENT AND TRADEMARK OFFICE
CERTIFICATE OF CORRECTION

PATENT NO. : 11,237,990 B2
APPLICATION NO. : 16/901517
DATED : February 1, 2022
INVENTOR(S) : Slota et al.

Page 1 of 1

It is certified that error appears in the above-identified patent and that said Letters Patent is hereby corrected as shown below:

In the Claims

In Column 12, Line 21, in Claim 2, after "payload", insert --,--

In Column 13, Line 4, in Claim 13, delete "(MC)" and insert --(NIC)-- therefor

In Column 13, Line 8, in Claim 13, delete "MC" and insert --NIC-- therefor

In Column 14, Line 13, in Claim 18, delete "fixeE" and insert --fixed-- therefor In Column 14, Line 20, in Claim 19, delete "NW" and insert --NIC-- therefor Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*